United States Patent
Kobayashi

(10) Patent No.: US 7,370,921 B2
(45) Date of Patent: May 13, 2008

(54) RECORDING APPARATUS

(75) Inventor: Isao Kobayashi, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 160 days.

(21) Appl. No.: 11/421,414

(22) Filed: May 31, 2006

(65) Prior Publication Data
US 2006/0274093 A1    Dec. 7, 2006

(30) Foreign Application Priority Data
Jun. 1, 2005   (JP) ............................. 2005-161168

(51) Int. Cl.
*B41J 29/38* (2006.01)
(52) U.S. Cl. ................. 347/5; 347/11; 347/12
(58) Field of Classification Search ............. 347/5, 347/9, 10, 11, 12, 19, 13, 14, 15
See application file for complete search history.

(56) References Cited

U.S. PATENT DOCUMENTS 5,281,980 A * 1/1994 Kishida et al. .............. 347/13
7,101,007 B2 * 9/2006 Hayasaki .................... 347/12
2003/0210288 A1 * 11/2003 Murata ........................ 347/5

FOREIGN PATENT DOCUMENTS

JP     2006158643      6/2000

* cited by examiner

*Primary Examiner*—Lam Son Nguyen
(74) *Attorney, Agent, or Firm*—Baker Botts L.L.P.

(57) ABSTRACT

A recording apparatus including: (a) a recording head unit for forming a recording operation with recording materials; (b) a main circuit for outputting drive waveform signal sets each including drive waveform signals; and (c) a head driver unit for receiving each drive waveform signal set, generating a drive signal based on one of the drive waveform signals that is selected among each received drive waveform signal set, and supplying the drive signal to each actuators of the recording head unit. The main circuit is connected to the head driver unit through signal wires that transmit the drive waveform signals of the drive waveform signal sets. The signal wires include common signal wires each transmitting one of the drive waveform signals of one of the drive waveform signal sets that controls ejection of one of the recording materials used in a first recording mode, and also one of the drive waveform signals of one of the drive waveform signal sets that controls ejection of one of the other recording materials used in a second recording mode.

22 Claims, 4 Drawing Sheets

US 7,370,921 B2

RECORDING APPARATUS

This application is based on Japanese Patent Application No. 2005-161168 filed on Jun. 1, 2005, the content of which is incorporated hereinto by reference.

BACKGROUND OF THE INVENTION

1. Field of the Invention

The present invention relates to a recording apparatus, for example, of inkjet type.

2. Discussion of Related Art

As a kind of recording apparatus, there is known an inkjet type recording apparatus for performing a recording operation. During the recording operation, an inkjet head unit is caused to eject recording materials (ink droplets) toward a recording medium, while a carriage carrying the head unit is moved such that the head unit is moved relative to the recording medium with a predetermined spacing distance therebetween being maintained As such an inkjet type recording apparatus, there is a recording apparatus in which a head driver unit mounted on the carriage is arranged to receive various data signals such as drive data signals (recording data signals) and drive waveform signals that are outputted from a main circuit disposed in a stationary main body of the apparatus. The inkjet head unit (herein after referred to as "recording head unit ") is operated by the head driver unit, so as to eject the ink droplets through a plurality of nozzles formed in the head unit.

FIG. 4 shows a basic arrangement of the recording apparatus. The head driver unit has four drive circuits 100C, 100M, 100Y, 100Bk arranged to receive serially transmitted drive data signals DATA C_0~C_2, M_0~M_2, Y_0~Y_2, Bk_0~Bk_2 (corresponding to cyan, magenta, yellow and black inks, respectively) and drive waveform signal sets FIRE C_1~C_6, FIRE M_1~M_6, FIRE Y_1~Y_6, FIRE Bk_1~Bk_6. Each of the serially transmitted drive data signals DATA C_0~C_2, M_0~M_2, Y_0~Y_2, Bk_0~Bk_2 is converted by a corresponding one of shift registers (serial-parallel converter) 101C, 101M, 101Y, 101Bk, into parallel data signals corresponding to respective nozzles. The parallel data signals are latched by D flip-flops 102C, 102M, 102Y, 102Bk. From among each of the drive waveform signal sets FIRE C_1~C_6, FIRE M_1~M_6, FIRE Y_1~Y_6, FIRE Bk_1~Bk_6, one drive waveform signal is selected by a corresponding one of multiplexers 103C, 103M, 103Y, 103Bk, based on the corresponding data signal. The multiplexers 103C, 103M, 103Y, 103Bk outputs the selected drive waveform signals, which are then received by respective driver buffers 105C, 105M, 105Y, 105Bk. Each of the driver buffers 105C, 105M, 105Y, 105Bk generates a drive signal having a predetermined voltage and a waveform corresponding to that of the received drive waveform signal, and then supplies the generated drive signal to each of actuators which are activated for ink ejection through the respective nozzles.

In the above-described recording apparatus, for performing a recording operation with gradation control, a plurality of drive waveform signals having respective different drive waveforms have to be available for each of the recording materials (different color inks), so that each recording material can be ejected as an ink droplet that is variable in its size. This arrangement results in increase of the number of signal wires required for supplying the drive waveform signals to the drive circuits of the head driver unit.

The increase of the number of the signal wires is disadvantageous in view of cost and maintenance performance. Particularly, where a flexible flat cable is used for transmitting the signals from the main circuit disposed in the stationary main body to the head driver unit carried by the carriage, the flexible flat wire has a width inevitably increased by the increased number of the signal wires, thereby necessitating a complicated disposition of the flexible flat cable and even increasing a load exerted on the carriage moved relative to the stationary main body.

In view of the above-described problems, there have been made various attempts to reduce the number of the signal wires for transmitting the drive waveform signals from the main circuit to the head driver unit. For example, there was proposed an arrangement, as disclosed in JP-2000-158643A, in which waveform-related data (e.g., data representative of pulse width) required for generation of drive waveform signals are serially transmitted to each of drive-waveform-signal generator circuits disposed in the recording head unit prior to a recording operation, and the drive waveform signals are generated based on the waveform-related data by the drive-waveform-signal generator circuits upon initiation of the recording operation.

In the above-described proposed arrangement, the number of the signal wires for transmitting the drive waveform signals from the main circuit to the head driver unit can be made smaller than in the conventional arrangement. However, the plurality of drive-waveform-signal generator circuits as extra components are required for the generations of the respective different drive waveform signals, whereby the recording head unit is inevitably increased in weight.

Meanwhile, it might be possible to establish an arrangement in which a full-color recording operation is made by using cyan, yellow and magenta inks without using a black ink, since a mixture of the cyan, yellow and magenta inks can provide an ink whose color is close to black. Such an arrangement could reduce the number of the signal wires, owing to elimination of signal wires serving for the black ink. However, the monochrome recording made by the mixture of the cyan, yellow and magenta inks cannot provide an image as clear as that provided by the monochrome recording made by the black ink, and is disadvantageous also with respect to cost performance. That is, the arrangement does not satisfy a need for a clear recording at a low cost. Further, since there is a requirement of recording with the drive waveform signals having respective waveforms suitable for characteristics of the respective color inks, the reduction of the number of the signal wires cannot be realized by arranging the drive waveform signal to be common to the respective color inks.

SUMMARY OF THE INVENTION

Under the above-described circumstance, the present invention was developed based on the present inventor's finding that, where the recording apparatus has a first recording mode for recording by using a particular one (for example, a black color material) of a plurality of recording materials and a second recording mode for recording by using the other recording material or materials, some of the signal wires are not used for transmitting the drive waveform signals during each of the first and second recording modes. That is, the present inventor found that some signal wires which are assigned to transmit the drive waveform signals for the other recording materials used in the second recording mode are not on duty in the first recording mode, and that it is possible to eliminate the signal wires exclusively used for transmitting the drive waveform signals for the particular recording material, if the above-described some signal wires are arranged to be used as common signal wires in the first recording mode as well as in the second recording mode.

It is therefore an object of the invention to provide a recording apparatus having an arrangement for making it possible to reduce the number of the signal wires used for transmitting the drive waveform signals from the main circuit (disposed in the stationary main body of the apparatus) to the head driver unit (carried by the carriage). This object may be achieved according to either of first and second aspects of the invention that are described below.

The first aspect of the invention provides a recording apparatus including: (a) a recording head unit having a plurality of actuators and operable to perform a dot recording operation using a plurality of recording materials that are ejected by activation of the actuators; (b) a main circuit operable to output a plurality of drive waveform signal sets, each of which includes drive waveform signals having respective waveforms different from each other, and each of which controls ejection of a corresponding one of the recording materials; and (c) a head driver unit operable to receive each of the drive waveform signal sets outputted from the main circuit, generate a drive signal based on one of the drive waveform signals that is selected from among each of the received drive waveform signal sets, and supply the generated drive signal to each of the plurality of actuators, wherein the recording apparatus is selectively switchable between a first recording mode in which the dot recording operation is performed by using one of the recording materials and a second recording mode in which the dot recording operation is performed by using the other of the recording materials, wherein the main circuit is connected to the head driver unit through a plurality of signal wires that transmit the drive waveform signals of the drive waveform signal sets from the main circuit to the head driver unit, and wherein the signal wires include at least one common signal wire each of which transmits one of the drive waveform signals of one of the drive waveform signal sets that controls ejection of the one of the recording materials used in the first recording mode, and also one of the drive waveform signals of one of the drive waveform signal sets that controls ejection of one of the other of the recording materials used in the second recording mode.

The second aspect of the invention provides a recording apparatus including: (a) a plurality of recording head units each of which has a plurality of actuators and each of which is operable to perform a dot recording operation using a recording material that is ejected by activation of the actuators; (b) a main circuit operable to output a plurality of drive waveform signal sets, each of which includes drive waveform signals having respective waveforms different from each other, and each of which controls ejection of the recording material from a corresponding one of the recording head units; and (c) a plurality of drive circuits each of which is operable to receive a corresponding one of the drive waveform signal sets outputted from the main circuit, generate a drive signal based on one of the drive waveform signals that is selected from among the corresponding drive waveform signal set, and supply the generated drive signal to each of the plurality of actuators of a corresponding one of the recording head units, wherein the recording apparatus is selectively switchable between a first recording mode in which the dot recording operation is performed by one of the recording head units and a second recording mode in which the dot recording operation is performed by the other of the recording head units, wherein the main circuit is connected to the drive circuits through a plurality of signal wires that transmit the drive waveform signals of the drive waveform signal sets from the main circuit to the drive circuits, and wherein the signal wires include at least one common signal wire each of which transmits one of the drive waveform signals of one of the drive waveform signal sets that is received by one of the drive circuits corresponding to the one of the recording head units performing the dot recording operation in the first recording mode, and also one of the drive waveform signals of one of the drive waveform signal sets that is received by one of the drive circuits corresponding to one of the other of the recording head units performing the dot recording operation in the second recording mode.

In the recording apparatus according to the invention, each of the at least one common signal wire is arranged to transmit at least two drive waveform signals. The at least two drive waveform signals include the signal of one of the drive waveform signal sets which controls ejection of the one of the recording materials used in the first recording mode or which controls ejection by the one of the recording heads operated in the first recording mode, and also the signal of one of the drive waveform signal sets which controls ejection of one of the other of the recording materials used in the second recording mode or which controls ejection by one of the other of the recoding heads operated in the second recording mode. The at least two signals are transmitted through each common signal wire selectively depending upon in which one of the first and second recording modes the recording apparatus is being currently placed. In this arrangement, the number of the signal wires required to transmit the drive waveform signal sets from the main circuit to the head driver unit or the drive circuits can be reduced by the number of the at least one common signal wire, so as to be smaller than a total number of the drive waveform signals of the drive waveform signal sets. The construction according to the present invention is advantageous, particularly, where each of the drive waveform signal set includes a large number of the drive waveform signals prepared for enabling the recording operation with a large number of levels of gradation, or where the same number of the drive waveform signal sets as the number of the ink materials are prepared for controlling ejection of the respective ink materials in respective manners suitable for characteristics of the respective ink materials.

The recording apparatus may be switched between the first and second recording modes, for example, by a mechanical or electrical switching device that is disposed in a main body of the apparatus (e.g., an operator panel) or in an external device (e.g., a personal computer) connected to the apparatus. Further, the apparatus may be switched between the first and second recording modes, for example, by a mode controller operable to determine on which of the first and second recording modes the apparatus should be placed, on the basis of drive data signals.

Further, in the recording apparatus according to the invention, each of the at least one common signal wire transmitting two drive waveform signals may have a fork at which the common signal wire is divided into branch portions that are contiguous to a common portion of the common signal wire. The common portion, which serves to transmit the two drive waveform signals, does not necessarily have to extend from the main circuit up to a corresponding one of drive circuits that are incorporated in the head driver unit. However, it is preferable that the common portion extends at least up to the head driver unit, so that at least a portion of the common signal wire moved together with movement of a carriage carrying the head driver unit is provided by the common portion.

Further, in the recording apparatus according to the invention, the at least one common signal wire may consist of a plurality of common signal wires which transmit the respective drive waveform signals of one drive waveform signal set that controls ejection of the one recording material used in the first recording mode, and also the respective drive waveform signals of one drive waveform signal set that controls ejection of one of the other recording materials used in the second recording mode. That is, where the at least one common signal wire consists of a plurality of common signal wires, all the common signal wires may arranged to transmit the signals of one drive waveform signal set that controls ejection of the recording material used in the first recording mode and the signals of the same drive waveform signal set that controls ejection of the recording material used in the second recording mode. However, all the common signal wires do not have to be arranged to transmit the signals of the same drive waveform signal set that controls ejection of the recording material used in the second recording mode (in addition to the signals of the drive waveform signal set that controls ejection of the recording material used in the first recording mode), but may be arranged to transmit the signals of two or more waveform signal sets that controls ejection of two or more recording materials used in the second recording mode (in addition to the signals of the drive waveform signal set that controls ejection of the recording material used in the first recording mode). This arrangement is usefull in a case where the number of the signals of the drive waveform signal set that controls ejection of the recording material used in the first recording mode is larger than the number of the signals of any one of the drive waveform signal sets that control ejection of respective recording materials used in the second recording mode.

BRIEF DESCRIPTION OF THE DRAWINGS

The above and other objects, features, advantages and technical and industrial significance of the present invention will be better understood by reading the following detailed description of presently preferred embodiment of the invention, when considered in connection with the accompanying drawings, in which.

DETAILED DESCRIPTION OF THE PREFERRED EMBODIMENT

Figure 1:
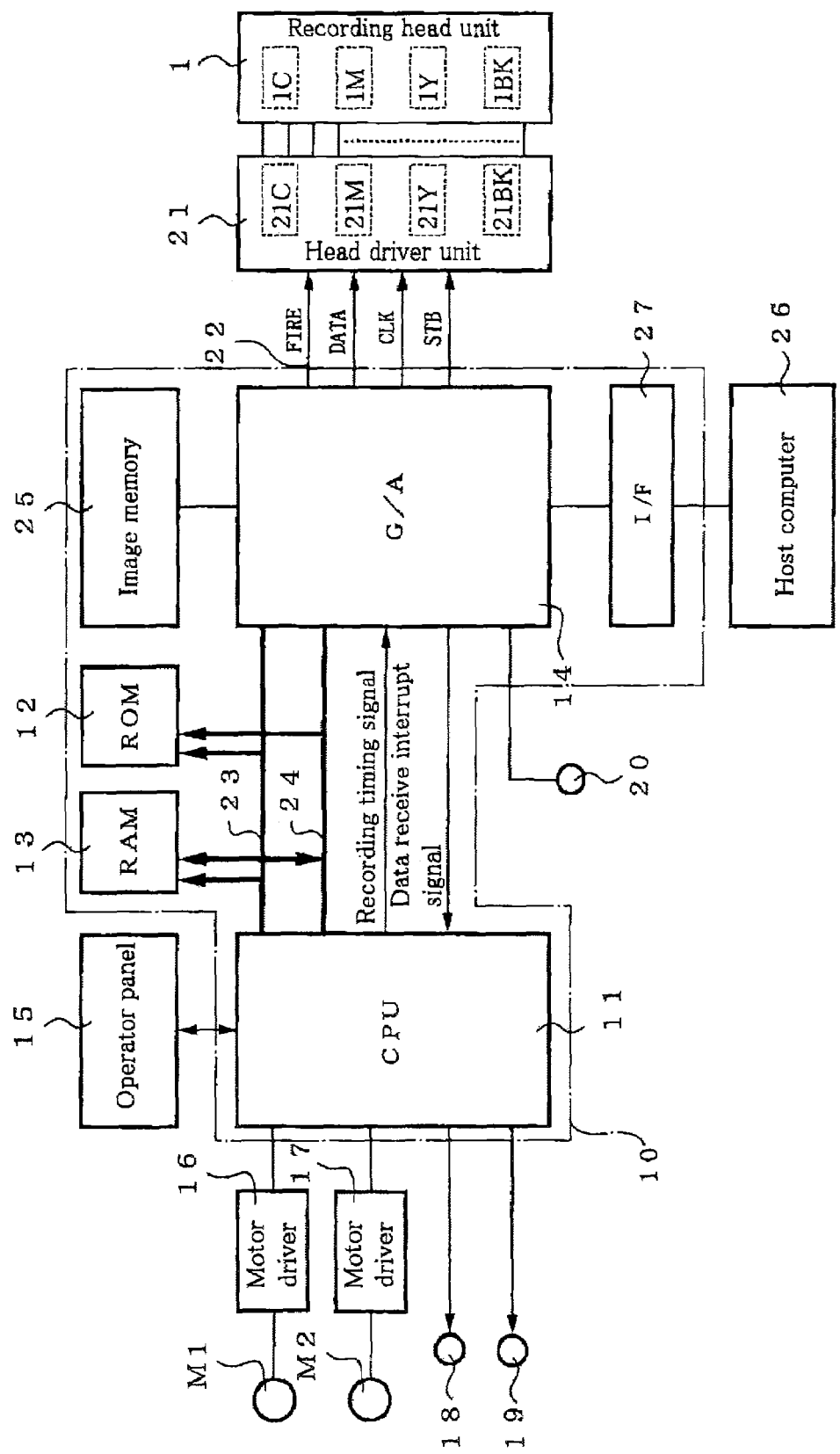
FIG. 1 is a block diagram showing an electrical arrangement in an inkjet-type recording apparatus constructed according to an embodiment of the invention.

There will be described a recording apparatus constructed according to the invention, with reference to FIGS. 1-3. This recording apparatus is of a known inkjet type, and includes a carriage (not shown) reciprocatively movable along a recording medium, and a recoding head unit mounted on the carriage and operable to eject ink droplets toward the recording medium.

The recording apparatus has a controller principally constituted by a main circuit 10 that includes: CPU 11 for processing drive data signals (print data signals) and controlling operation of the recording apparatus; ROM 12 for storing programs executed by the CPU 11; RAM 13 for temporarily storing data during processing of the data signals by the CPU 11; and a gate array (G/A) 14 provided by a gate circuit LSI. To the CPU 11, there are connected: an operator panel 15 through which the user enters desired commands (e.g., printing command) into the CPU 11; a motor driver 16 for driving a carriage motor MI (for reciprocatively moving the carriage); a motor driver 17 for driving a paper feed motor M2 (for feeding the recording medium in the form of a recording paper sheet in a predetermined direction); a paper presence sensor 18 for detecting a leading edge of the paper sheet; a home position sensor 19 for confirming that the carriage carrying a recording head unit 1 is positioned in its home position when it is returned to the home position.

The recording head unit 1 includes four recording portions 1C, 1M, 1Y, 1Bk that are respectively operable to eject cyan, magenta, yellow and black inks as a plurality of recording materials. The recording portions 1C, 1M, 1Y, 1Bk are driven by respective drive circuits 21C, 21M, 21Y, 21Bk of a head driver unit 21 (see FIG. 2) that is mounted together with the recording head unit 1 on the carriage. The head driver unit 21 and the gate array 22 are connected through a flexible flat cable 22 (harness cable), so that the head driver unit 21 can be controlled by the gate array 14. The recording apparatus is selectively switchable between a first recording mode (monochrome mode) in which the recording operation is performed by using the black ink as a particular one of the recording materials, and a second recording mode (color mode) in which the recording operation is performed by using the cyan, magenta and yellow inks as the others of the recording materials.

Although not being specifically illustrated in the drawings, each of the recording portions 1C, 1M, 1Y, 1Bk has a plurality of actuators (not shown) each of which is provided by a piezoelectric element and an electrostriction element, a plurality of ink chambers storing therein the inks, and a plurality of nozzles (not shown) held in communication with the respective ink chambers. The volumes of the respective ink chambers are changed (increased and reduced) independently of each other, by activations of the respective actuators. Thus, the ink in the form of an ink droplet is ejected through each nozzle when the volume of the corresponding ink chamber is changed. The actuators are activated by driver buffers 44C, 44M, 44Y, 44Bk of the head driver unit 21 that are connected to electrodes provided in the recording head unit 1. The head driver unit 21 is controlled by the gate array 14 to generate a drive signal having a waveform suitable for the recording head unit 1 and apply the generated drive signal to each of the electrodes. Tb the gate array 14, there is connected an encoder 20 that is arranged to detect a position of the carriage 2.

The CPU 11 is connected to the ROM 12, RAM 13 and gate array 14 via an address bus 23 and a data bus 24. The CPU 11 generates a recording timing signal and a reset signal in accordance with the programs prestored in the ROM 12, and transmits the signals to the gate array 14. Four drive waveform signal sets FIRE C_1~C_6, FIRE M_1~M_6, FIRE Y_1~Y_6, FIRE Bk_1~Bk_6 are prestored in the ROM 13, or are transmitted together with the drive data signals from a host computer (personal computer) 26 via an interface 27 to the RAM 12 or an image memory 27 so as to be stored in the RAM 12 or image memory 27.

The drive waveform signal sets stored in the ROM 13, RAM 12 or image memory 27 is supplied to the gate array 14, in a recording operation. The host computer 26 serves as a mode controller or mode selector operable to select, based on drive data, one of the above-described first and second recording modes by which the recording operation is to be performed, and output a mode signal representative of the selected mode.

The gate array 14 receives an image data transmitted from the host computer 26 as an external device via the interface 27, and supplies the image data to the image memory 25 so that the image data is temporarily stored in the image memory 25. Further, the gate array 14 generates data a receive interrupt signal, based on the drive data signals transmitted from the host computer via the interface 27, and supplies the data receive interrupt signal to the CPU 11. The gate array 14 generates a clock signal CLK and a strobe control signal STB, based on the recording timing signal and control signals supplied from the encoder 20, and generates drive data signals DATA (DATA C_0~C_2, M_0~M_2, Y_0~Y_2, Bk_0~Bk_2) (for forming the image data on the recording medium), based on the image data temporarily stored in the image memory 25. The gate array 14 transmits the generated drive data signals DATA in synchronization with the clock signal CLK, to the head driver unit 21. Further, the gate array 14 transmits, in response to the recording timing signals and the a control signal supplied from the encoder 20, the drive waveform signal sets FIRE C_1~C_6, FIRE M_1~M_6, FIRE Y_1~Y_6, FIRE Bk_1~Bk_6 in synchronization with the clock signal CLK, to the head driver unit 21. The transmissions of the signals from the gate array 14 to the head driver unit 21 are made through the flexible flat cable 22 that connects the gate array 14 and the head driver unit 21.

The gate array 14 serves as an activator-signal controller operable, when the recording apparatus is being placed in the first recording mode, to inhibit output of the drive data signals DATA C_0~C_2, DATA_0~M_2, DATA Y_0~Y_2 that cause activations of the actuators by which non-black materials (cyan, magenta and yellow inks) are ejected. When the recording apparatus is being placed in the second recording mode, the gate array 14 serving as the activator-signal controller inhibits output of the drive data signals DATA Bk_0~Bk_2 that cause activations of the actuators by which the black ink is ejected. It is noted that the drive data signals serve also as activator signals for activating the actuators of the recording head unit 1.

Figure 2:
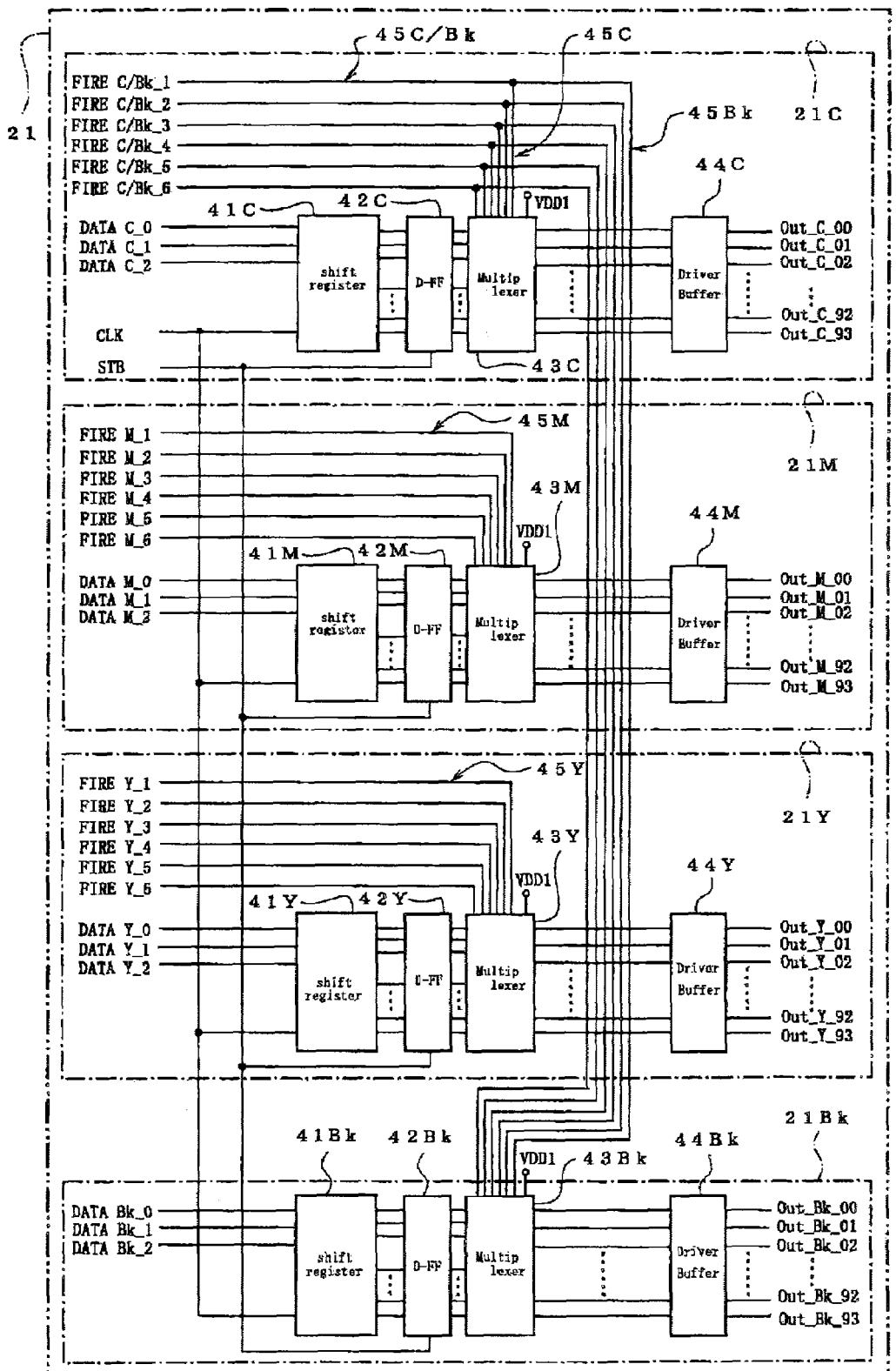
FIG. 2 is a block diagram showing a head driver unit of the recording apparatus of FIG. 1.
Figure 3:
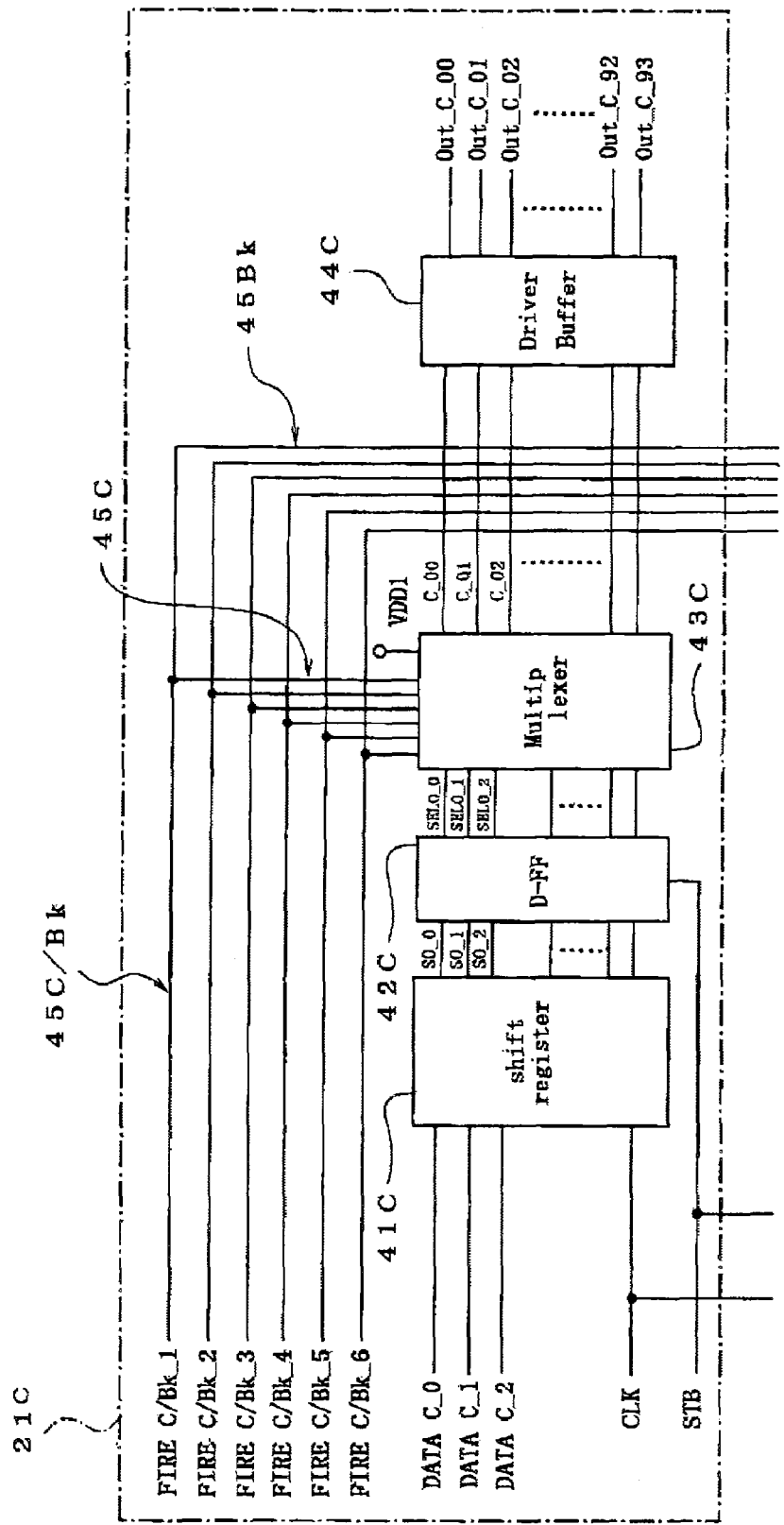
FIG. 3 is a block diagram showing, as a part of the head driver unit of FIG. 2, a driver circuit serving for ejection of a cyan ink.
Figure 4:
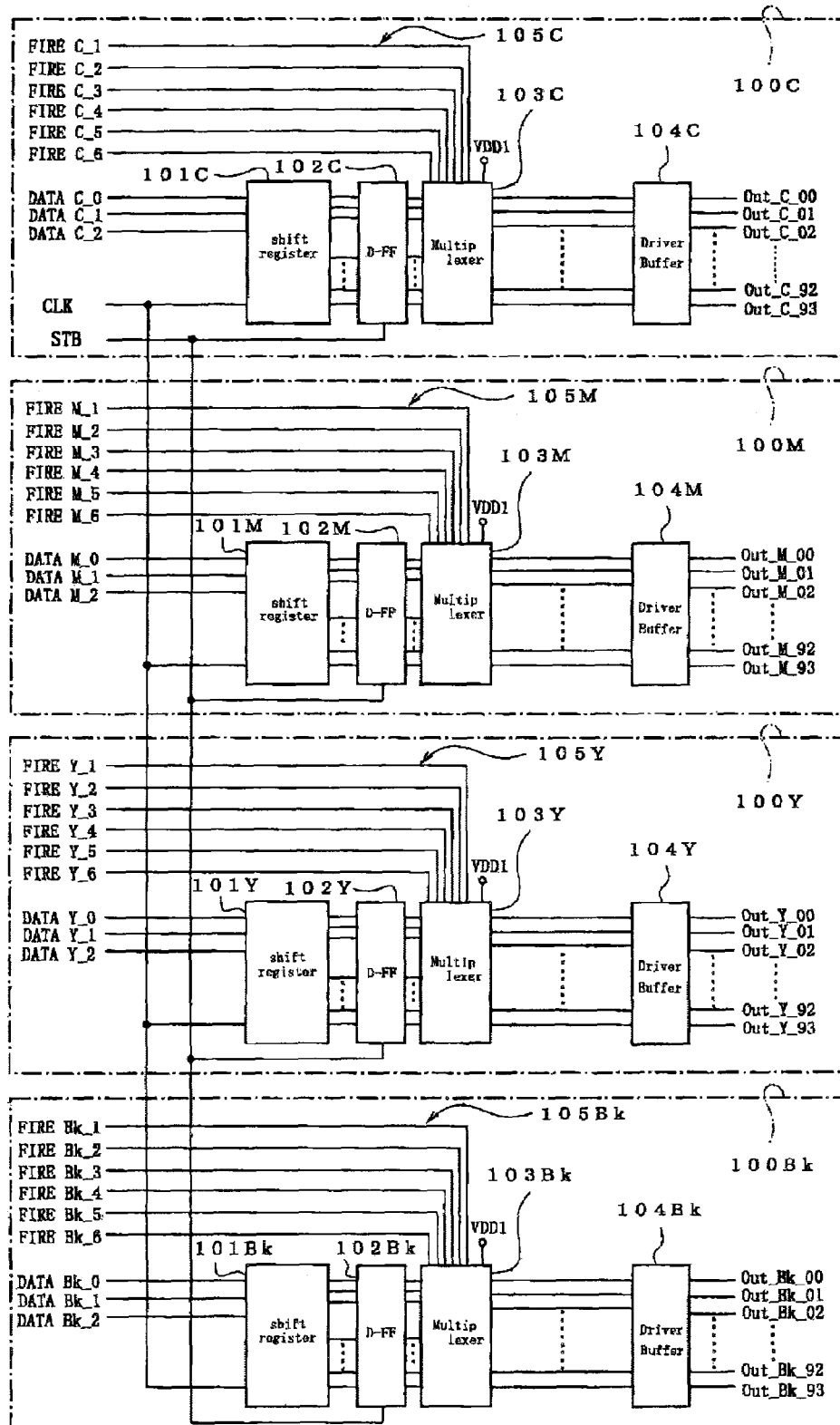
FIG. 4 is a block diagram showing a head driver unit of a conventional inkjet-type recording apparatus.

The four drive circuits 21C, 21M, 21Y, 21Bk incorporated in the head deriver unit 21 are electrically connected to the actuators of respective four recording portions 1C, 1M, 1Y, 1Bk of the recording head unit 1 that are arranged to eject the cyan, magenta, yellow and black inks, respectively (see FIG. 2).

The drive circuits 21C, 21M, 21Y, 21Bk have respective shift register 41C, 41M, 41Y, 41Bk as serial-parallel converters for converting the serially transmitted drive data signals DATA (DATA C_0~0_2, DATA M_0~M_2, DATA Y_0~Y_2, DATA Bk_0~Bk_2) into parallel data signals corresponding to the respective actuators. The drive circuits 21C, 21M, 21Y, 21Bk further have D flip-flops 42C, 42M, 42Y, 42Bk, multiplexers (selectors) 43C, 43M, 43Y, 43Bk and the above-described driver buffers 44C, 44M, 44Y, 44Bk. The drive waveform signal sets FIRE C_1~C_6, FIRE M_1~M_6, FIRE Y_1~Y_6, FIRE Bk_1~Bk_6, as well as the parallel data signals, are inputted to the respective multiplexers (selectors) 43C, 43M, 43Y, 43Bk, depending on the recording mode in which the recording apparatus is being currently placed.

In the present embodiment, the drive waveform signal sets FIRE C_1~C_6, FIRE Bk_1~Bk_6 are inputted to the multiplexers 43C, 43Bk through six common signal wires. Each of the six common signal wires includes a common portion 45C/Bk and two branch portions 45C, 45Bk. The common portion 45C/Bk of each common signal wire is connected to the gate array 14. The two branch portions 45C, 45Bk of each common signal wire are connected to the multiplexers 43C, 43Bk of the drive circuits 21C, 21Bk, respectively. Each common signal wire has a fork at which the signal wire is divided into the two branch portions 45C, 45Bk, such that the fork and the branch portions 45C, 45Bk are located within the drive circuit 21C.

The gate array 14 includes a drive-waveform-signal-set selector operable to receive a signal provided by the mode selector, and to select at least one of the drive waveform signal sets FIRE C_1~C_6, FIRE Bk_1~Bk_6 that is to be outputted to the drive circuits 21C, 21Bk from the gate array 14 through the common signal wires 45C/Bk, 45C, 45Bk. That is, the common signal wires 45C/Bk, 45C, 45Bk are used as signal wires transmitting the drive waveform signal set FIRE Bk_1~Bk_6 controlling ejection of the black ink as the particular recording material during the first recording mode, and are used as signal wires transmitting the drive waveform signal set FIRE C_1~C_6 controlling ejection of the cyan ink as one of the other recording materials during the second recording mode.

Therefore, during the first recording mode (monochrome mode), the drive waveform signal set FIRE Bk_1~Bk_6 is inputted to the multiplexer 43Bk, and the monochrome recording is performed by at least one signal of the drive waveform signal set FIRE Bk_1~Bk_6 that is selected in the multiplexer 43Bk. In this instance, the drive waveform signal set FIRE Bk_1~Bk_6 is inputted to the multiplexer 43C in addition to the multiplexer 43Bk. However, since the drive data signals DATA are not inputted to the shift register 41C corresponding to the multiplexer 43C, any one of signals of the drive waveform signal set FIRE Bk_1~Bk_6 is not selected in the multiplexer 43C. Further, the drive waveform signal sets FIRE M_1~M_6, FIRE Y_1~Y_6 are not inputted to the multiplexers 43M 43Y, so that any one of the signals of the drive waveform signal sets is not selected in the multiplexers 43M, 43Y.

On the other hand, during the second recording mode (color mode), the drive waveform signal set FIRE C_1~C_6 is inputted to the multiplexer 43C, and at least one signal of the drive waveform signal set FIRE C_1~C_6 is selected in the multiplexer 43C. In this instance, the drive waveform signal set FIRE C_1~C_6 is inputted to the multiplexer 43Bk in addition to the multiplexer 43C. However, since the drive data signals DATA are not inputted to the shift register 41Bk corresponding to the multiplexer 43Bk, any one of signals of the drive waveform signal set FIRE C_1~C_6 is not selected in the multiplexer 43Bk. Further, the drive waveform signal sets FIRE M_1~M_6, FIRE Y_1~Y_6 are inputted to the multiplexers 43M, 43Y, so that the color recording is effected by at least one signal selected from among each of the drive waveform signal sets FIRE C_1~C_6, FIRE M_1~M_6, FIRE Y_1~Y_6.

Where the recording head unit 1 is provided by a 94 channel multi-nozzle head unit in which a total of 94 ink chambers are provided for each of the recording materials, each of the shift registers 41C, 41M, 41Y, 4lBk is provided by a shift register of 94 bits long×3. The shift registers 41C, 41M, 41Y, 41Bk are arranged to receive the drive data signals DATA (DATA C_0~C_2, DATA M_0~M_2, DATA Y_0~Y_2, DATA Bk_0~Bk_2) that are serially transmitted from the gate array 14 in synchronization with the clock signal CLK. Each of the shift registers 41C, 41M, 41Y, 41Bk is operated, upon a leading edge of each pulse of the clock signal CLK (i.e., upon a transition from a low voltage region to a high voltage region of the clock signal CLK, to convert each of the drive data signals into parallel signals serving as activator signals (including a selection signal SEL0_0, SEL0_1, SEL0_2) for activating the actuators to change volumes of the respective ink chambers. Thus, each of the activator signals is constituted by the selection signal of 3 bits, so that one of six drive waveform signals is selected from among the corresponding drive waveform signal set, based on a combination of the 3 bits.

Each of the D flip-flops 42C, 42M, 42Y, 42Bk is operated, upon a leading edge of each pulse of the strobe control signal STB transmitted from the gate array 14, to latch each of the activator signals.

Each of the multiplexers 43C, 43M, 43Y, 43Bk is operated to select one of the six drive waveform signals from among a corresponding one of the drive waveform signal sets FIRE C_1~C_6, FIRE M_1~M_6, FIRE Y_1~Y_6, FIRE Bk_1~Bk_6, based on a content represented by the selection signal of 3 bits supplied from a corresponding one of the D flip-flops 42C, 42M, 42Y, 42Bk, and to supply the selected drive waveform signal to a corresponding one of the drive buffers 44C, 44M, 44Y, 44Bk.

In the present embodiment in which each drive waveform signal set is constituted by the six drive waveform signals, the six drive waveform signals have respective waveforms that are different from each other with respect to the number of pulses, and are repeatedly inputted to a corresponding one of the multiplexers 43C, 43M, 43Y, 43Bk at a constant cycle. Each of the multiplexers 43C, 43M, 43Y, 43Bk selects one of the six drive waveform signals, when receiving the selection signal SEL0_0, SEL0_1, SEL0_2 included in the activator signal. Specifically described, where the selection signal SEL0_0, SEL0_1, SEL0_2 is 0, 0, 0, a non-recording (non-printing) is selected. Where the selection signal is 0, 1, 0, the drive waveform signal FIRE C_1, FIRE M_1, FIRE Y_1 or FIRE Bk_1 is selected. Where the selection signal is 0, 0, 1, the drive waveform signal FIRE C_2, FIRE M_2, FIRE Y_2 or FIRE Bk_2 is selected. Where the selection signal is 1, 0, 0, the drive waveform signal FIRE C_3, FIRE M_3, FIRE Y_3 or FIRE Bk_3 is selected. Thus, the ejection of the ink through each nozzle can be controlled in a total of seven levels of gradation (including a non-ejection).

Each of the driver buffers 44C, 44M, 44Y, 44Bk is operated to generate, based on the drive waveform signal outputted from a corresponding one of the multiplexers 43C, 43M, 43Y, 43Bk, a drive signal having a predetermined voltage (suitable for the recoding head unit 1) and a waveform corresponding to that of the outputted drive waveform signal, and then supply the generated drive signal to each actuator serving for the ejection of the ink from the corresponding nozzle.

While the number of the ink chambers or nozzles provided for each of the recording materials is 94 in the present embodiment, the number may be other than 94, too. In this case, the bit length of each of the shift registers 41C, 41M, 41Y, 41Bk, D flip-flops 42C, 42M, 42Y, 42Bk, multiplexers (selector) 43C, 43M, 43Y, 43Bk and driver buffers 44C, 44M, 44Y, 44Bk may be adapted to be equal to the number of the ink chambers or nozzles provided for each of the recording materials. Further, the number of the drive waveform signals of each drive waveform signal set does not necessarily have to be six, but may be other than six.

There will be next described the operation of the head driver unit 21.

The drive data signals DATA C_0~C_2, M_0~M_2, Y_0~Y_2, Bk_0~Bk_2 are read out from the image memory 25 by the gate array 14, and are then serially transmitted to the drive circuits 21C, 21M, 21Y, 21Bk of the head driver unit 21 via the flexible flat cable 22. The thus serially transmitted drive data signals DATA C_0~C_2, M_0~M_2, Y_0~Y_2, Bk_0~Bk_2 are converted by the shift registers 41C, 41M, 41Y, 41Bk, into the parallel signals, each of which is then outputted as the activator signal (the selection signal of 3 bits) from the D flip-flops 42C, 42M, 42Y, 42Bk to the multiplexers 43C, 43M, 43Y, 43Bk. Each of the multiplexers 43C, 43M, 43Y, 43Bk selects one of the six drive waveform signals from among a corresponding one of the drive waveform signal sets FIRE C_1~C_6, FIRE M_1~M_6, FIRE Y_1~Y_6, FIRE Bk_1~Bk_6 that are parallelly transmitted from the gate array 14 to the multiplexers 43C, 43M, 43Y, 43Bk, based on the activator signal supplied from a corresponding one of the D flip-flops 42C, 42M, 42Y, 42Bk, and to supply the selected drive waveform signal to a corresponding one of the drive buffers 44G, 44M, 44Y, 44Bk, for serving for the ejection of the ink through each of the plurality of nozzles of the recording head unit 1. Each of the drive waveform signals has at least one drive pulse for the recording.

Since the drive circuits 21C, 21M, 21Y, 21Bk are substantially identical in construction with each other, only the driver circuit 21C as one of the drive circuits will be described. To the shift register 41C, as best shown in FIG. 3, there are inputted the drive data signals DATA C_0, DATA C_1, DATA C_2 that are serially transmitted from the gate array 14 in synchronization with the clock signal CLK. The shift register 41C has a bit length corresponding to a product of the number (e.g., 94) of the nozzles assigned for ejection of the cyan ink and the number of bits of the activator signal. Each of the shift registers 41C, 41M, 41Y, 41Bk is operated, upon the leading edge of each pulse of the clock signal CLK, to convert each of the drive data signals DATA C_0, DATA C_1, DATA C_2 into parallel signals in the form of a total of 94 activator signals S*_0, S*_1, S*_2 ("*" represents one of numbers 0-93), and to outputs the 94 activator signals S*_0, S*_1, S*_2.

The D flip-flop 42C is operated, upon the leading edge of each pulse of the strobe control signal STB transmitted from the gate array 14 of the main circuit 10, to output the 94 activator signals S*_0, S*_1, S*_2 as 94 selection signals SEL*_0, SEL*_1, SEL*_2 that are supplied to the multiplexer 43C. The bit length of the D flip-flop 42C is equal to that of the shift register 41C.

Meanwhile, the drive waveform signals FIRE C_1 FIRE C_2, FIRE C_3, FIRE C_4, FIRE C_5, FIRE C_6, which are outputted from a drive-waveform-signal generator (not shown) of the gate array 14 of the main circuit 10, are inputted to the multiplexer 43C.

The multiplexer 43C selects one of the six drive waveform signals FIRE C_1, FIRE C_2, FIRE C_3, FIRE C_4, FIRE C_5, FIRE C_6, based on the selection signal SEL*_0 SEL*_1, SEL*_2 supplied from the D flip-flop 42C. Then, the multiplexer 43C outputs the selected drive waveform signal.

The driver buffer 44C generates a drive signal C_00, based on the drive waveform signal outputted from the multiplexer 43C, and then supplies the generated drive signal C_00 to each actuator, so that the cyan ink is ejected through the corresponding nozzle as a result of activation of the actuator. Thus, the recording operation with gradation control is performed by an ink droplet ejected through each nozzle and corresponding to the waveform (e.g., the number of drive pulses and the pulse width) of the drive waveform signal that is selected based on the activator signal (selection signal SEL0_0, SEL0_1, SEL0_2).

While the recording condition remains unchanged, the drive waveform signals FIRE C_1~C_6, FIRE M_1~M_6, FIRE Y_1~Y_6, FIRE Bk_1~Bk_6 are repeatedly read out by the gate array 14 at a constant cycle, and are repeated supplied from the gate array 14 to the head driver unit 21.

In the above-described embodiment, each of the drive waveform signals FIRE C_1~C_6, FIRE M_1~M_6, FIRE Y_1~Y_6, FIRE Bk_1~Bk_6 has a length corresponding to a recording cycle. The strobe control signal STB, which is inputted to the D flip-flops 42C, 42M, 42Y, 42Bk, has a cycle corresponding to the recording cycle.

In the recording apparatus of the above-described embodiment that is arranged to perform a color recording operation, the drive waveform signals transmitted to the head driver unit 21 are set to be suitable for characteristics of the respective inks (recording materials).

For changing the drive waveform signals FIRE C_1~C_6, FIRE M_1~M_6, FIRE Y_1~Y_6, FIRE Bk_1~_1~Bk_6 depending on the recording condition, the drive data signals DATA (DATA C_0~C_2, DATA M_0~M_2, DATA Y_0~Y_2, DATA Bk_0~Bk_2) may be rewritten as needed, so that the written drive data signals DATA are transmitted from the host computer 26 and is stored in the RAM 12 or the image memory 25. For example, where the host computer 26 transmits a large number of image data for causing substantially concurrent ink ejection through a large number of the nozzles, the drive data signals DATA may be modified such that a large number of the drive pulses of the drive signals do not overlap with each other, for reducing a peak value of electric power consumed by the recording head unit 1 and for avoiding a so-called "cross talk" between the adjacent ink chambers.

Further, it is possible to modify, depending on an environmental condition such as temperature, the drive data signals DATA (DATA C_0~C_2, DATA M_0~M_2, DATA Y_0~Y_2, DATA Bk_0~Bk_0~2) outputted from the gate array 14.

In the above-described embodiment, the mode selector constituted by the host computer 26 is arranged to determine, on the basis of the drive data, one of the first and second recording modes by which the recording operation is to be performed. However, the mode selector may be provided by an external switch that is operable to mechanically or electrically select one of the first and second recording modes. The external switch may be disposed, for example, on the operator panel 15 of the apparatus.

In the above-described embodiment, the common signal wires are arranged to transmit the drive waveform signal set FIRE Bk_1~Bk_6 controlling ejection of the black ink and also the drive waveform signal set FIRE C_0~C_6 controlling ejection of the cyan ink. However, the common signal wires may be arranged to transmit the drive waveform signal set FIRE M_1~M_6 or FIRE Y_1~Y_6 in place of the drive waveform signal set FIRE C_1~C_6, in addition to the drive waveform signal set FIRE Bk_1~Bk_6.

In the above-described embodiment, the two drive waveform signal sets, which are selectively transmitted through the common signal wires to the drive circuits, are different from each other. However, where the two ink materials (one of which is used in the first recording mode and the other of which is used in the second recording mode) are similar to each other in characteristics, the drive waveform signal sets transmitted through the common signal wires may be identical with each other. In this case, the drive waveform signal sets transmitted through the common signal wires and identical with each other can be considered to be a single drive waveform signal set that is common to the two ink materials.

In the above-described embodiment, the number of the signal wires required to transmit the drive waveform signal set controlling ejection of the particular recording material (black ink) is equal to the number of the signal wires required to transmit the drive waveform signal set controlling ejection of each of the other ink materials (cyan, magenta, yellow inks). However, the present invention is applicable also to a case where the number of the signal wires required to transmit the drive waveform signal set controlling ejection of the particular recording material is larger than the number of the signal wires required to transmit the drive waveform signal set controlling ejection of each of the other ink material. In this case, the common signal wires may be arranged to transmit the signals of two or more waveform signal sets controlling ejection of two or more of the other ink materials, in addition to the signals of the drive waveform signal set controlling ejection of the particular recording material. For example, some of the common signal wires may be arranged to transmit the drive waveform signal or signals controlling ejection of the black ink (as the particular recording material) and the drive waveform signal or signals controlling ejection of the cyan ink (as one of the other recording materials), while the other of the common signal wires may be arranged to transmit the drive waveform signal or signals controlling ejection of the black ink and the drive waveform signal or signals controlling ejection of the magenta or yellow ink (as another of the other recording materials).

In the above-described embodiment, the recording head unit 1 includes the four recording portions 1C, 1M, 1Y, 1Bk operable to eject the cyan, magenta, yellow and black inks, respectively, and the nozzles are arranged in at least one row in each of the four recording portions 1C, 1M, 1Y, 1Bk, so that the corresponding ink is ejected through the nozzles arranged in the row or rows. However, the invention is applicable also to a case where the recording head portions 1C, 1M, 1Y, 1Bk are provided by respective recording head units independent from each other, rather than being provided by a single recording head unit.

In this case in which the recording apparatus has the recording head units 1C, 1M, 1Y, 1Bk, the recording apparatus is selectively switchable between the first recording mode in which the recording operation is performed by a particular one of the recording head units iC, 1M, 1Y, 1Bk and the second recording mode in which the recording operation is performed by the other of the recording head units 1C, 1M, 1Y, 1Bk. Each of the common signal wires is arranged to transmit one of the signals of one of the drive waveform signal sets that is received by one of the drive circuits 21C, 21M, 21Y, 21Bk corresponding to the particular recording head unit performing the recording operation in the first recording mode, and also one of the signals of one of the drive waveform signal sets that is received by one of the drive circuits corresponding to one of the other recording head units performing the recording operation in the second recording mode.

While the recoding apparatus is of inkjet type in the above-described embodiment, the present invention is equally applicable to a recording apparatus of other type, for example, having an impact recording head or a thermal recording head.

In the above-described embodiment, each of the multiplexers 43C, 43M, 43Y, 43Bk is operated to select one of the drive waveform signals from among a corresponding one of the drive waveform signal sets FIRE C_1~C_6, FIRE M_1~M_6, FIRE Y_1~Y_6, FIRE Bk_1~Bk_6, based on a desired level of gradation, i.e., a desired degree of recording density (printing density) that is represented by the selection signal. However, the selection of the drive waveform signal may be made by a so-called "history control". Specifically, in the recording apparatus of impact type, the drive waveform signal selection may be made depending upon whether there is any drive data preceding or following the current drive data, so that the selection is made by taking account of vibration remaining in an impact element. In the recording apparatus of thermal type, the drive waveform signal selection may be made depending upon whether there is any drive data preceding or following the current drive data, so that the selection is made by taking account of heat remaining in a heater element.

What is claimed is:

1. A recording apparatus comprising:
   a recording head unit having a plurality of actuators and operable to perform a dot recording operation using a plurality of recording materials that are ejected by activation of said actuators;
   a main circuit operable to output a plurality of drive waveform signal sets, each of which includes drive waveform signals having respective waveforms different from each other, and each of which controls ejection of a corresponding one of the recording materials; and
   a head driver unit operable to receive each of said drive waveform signal sets outputted from said main circuit, generate a drive signal based on one of said drive waveform signals that is selected from among each of the received drive waveform signal sets, and supply the generated drive signal to each of said plurality of actuators,
   wherein said recording apparatus is selectively switchable between a first recording mode in which the dot recording operation is performed by using one of the recording materials and a second recording mode in which the dot recording operation is performed by using the other of the recording materials,
   wherein said main circuit is connected to said head driver unit through a plurality of signal wires that transmit said drive waveform signals of said drive waveform signal sets from said main circuit to said head driver unit,
   and wherein said signal wires include at least one common signal wire each of which transmits one of said drive waveform signals of one of said drive waveform signal sets that controls ejection of said one of the recording materials used in said first recording mode, and also one of said drive waveform signals of one of said drive waveform signal sets that controls ejection of one of said other of the recording materials used in said second recording mode.

2. The recording apparatus according to claim 1,
   wherein said main circuit is operable to output, in addition to said plurality of drive waveform signal sets, activator signals for activating said actuators,
   and wherein said head driver unit is operable to receive said activator signals in addition to said drive waveform signal sets.

3. The recording apparatus according to claim 2,
   wherein said main circuit includes an activator-signal controller operable, when said recording apparatus is being placed in said first recording mode, to inhibit output of ones of said activator signals that cause activation of ones of said actuators by which said other of the recording materials is ejected,
   and wherein said activator-signal controller is operable, when said recording apparatus is being placed in said second recording mode, to inhibit output of ones of said activator signals that cause activation of ones of said actuators by which said one of the recording materials is ejected.

4. The recording apparatus according to claim 2,
   wherein each of said activator signals outputted from said main circuit and received by said head driver unit contains a selection data,
   and wherein said head driver unit selects one of said drive waveform signals from among each of said drive waveform signal sets, based on said selection data, and generates said drive signal having a waveform corresponding to the waveform of the selected one of said drive waveform signals.

5. The recording apparatus according to claim 1, wherein said at least one common signal wire consists of a plurality of common signal wires which transmit the respective drive waveform signals of the one drive waveform signal set that controls ejection of the one recording material used in said first recording mode, and also the respective drive waveform signals of the one drive waveform signal set that controls ejection of the one recording material used in said second recording mode.

6. The recording apparatus according to claim 1, wherein the number of said at least one common signal wire is equal to or smaller than the number of ones of said signal wires that are required to transmit the respective drive waveform signals of one of said drive waveform signal sets that controls ejection of one of said other of the recording materials used in said second recording mode.

7. The recording apparatus according to claim 1,
   wherein said head driver unit has a plurality of drive circuits each operable to receive a corresponding one of said drive waveform signal sets outputted from said main circuit, generate said drive signal based on one of said drive waveform signals that is selected from among the corresponding drive waveform signal set, and supply the generated drive signal to each of said plurality of actuators,
   wherein said main circuit is connected to said drive circuits of said head driver unit through said signal wires that transmit said drive waveform signal sets from said main circuit to said drive circuits,
   wherein each of said at least one common signal wire has a fork at which the common signal wire is divided into branch portions that are connected to the respective drive circuits,
   and wherein said fork and said branch portions of each of said at least one common signal wire are located within said head driver unit.

8. The recording apparatus according to claim 1, wherein said recording head unit performs the dot recording operation using a black color material as said one of the recording materials, when said recording apparatus is being placed in said first recording mode.

9. The recording apparatus according to claim 1, wherein said main circuit includes a drive-waveform-signal-set selector operable to select at least one of said plurality of drive waveform signal sets that is to be outputted from said main circuit, depending upon in which one of said first and second recording modes said recording apparatus is placed.

10. The recording apparatus according to claim 1, further comprising:
   a stationary main body in which said main circuit is fixedly disposed;
   a carriage movable relative to said stationary main body and carrying said recording head unit and said head driver unit; and
   a flexible cable connecting said main circuit and said head driver unit,
   wherein each of said at least one common signal wire has a fork at which the common signal wire is divided into branch portions that are contiguous to a common portion of said common signal wire,
   and wherein said common portion of each of said at least one common signal wire is provided by said flexible cable.

11. The recording apparatus according to claim 1,
   wherein said recording head unit has a plurality of ink chambers each of which stores therein an ink as a corresponding one of the recording materials,
   and wherein each of said actuators is activated by said drive signal, so as to change a volume of a corresponding one of said ink chambers, for ejecting the ink in the form of an ink droplet.

12. A recording apparatus comprising:
   a plurality of recording head units each of which has a plurality of actuators and each of which is operable to perform a dot recording operation using a recording material that is ejected by activation of said actuators;
   a main circuit operable to output a plurality of drive waveform signal sets, each of which includes drive waveform signals having respective waveforms different from each other, and each of which controls ejection of the recording material from a corresponding one of said recording head units; and
   a plurality of drive circuits each of which is operable to receive a corresponding one of said drive waveform signal sets outputted from said main circuit, generate a drive signal based on one of said drive waveform signals that is selected from among the corresponding drive waveform signal set, and supply the generated drive signal to each of said plurality of actuators of a corresponding one of said recording head units,
   wherein said recording apparatus is selectively switchable between a first recording mode in which the dot recording operation is performed by one of said recording head units and a second recording mode in which the dot recording operation is performed by the other of said recording head units,
   wherein said main circuit is connected to said drive circuits through a plurality of signal wires that transmit said drive waveform signals of said drive waveform signal sets from said main circuit to said drive circuits,
   and wherein said signal wires include at least one common signal wire each of which transmits one of said drive waveform signals of one of said drive waveform signal sets that is received by one of said drive circuits corresponding to said one of said recording head units performing the dot recording operation in said first recording mode, and also one of said drive waveform signals of one of said drive waveform signal sets that is received by one of said drive circuits corresponding to one of said other of said recording head units performing the dot recording operation in said second recording mode.

13. The recording apparatus according to claim 12,
   wherein said main circuit is operable to output, in addition to said plurality of drive waveform signal sets, activator signals for activating said actuators,
   and wherein said drive circuits are operable to receive said activator signals in addition to said drive waveform signal sets.

14. The recording apparatus according to claim 13,
   wherein said main circuit includes an activator-signal controller operable, when said recording apparatus is being placed in said first recording mode, to inhibit output of ones of said activator signals that are directed to ones of said drive circuits corresponding to said other of said recording head units performing the dot recording operation in said second recording mode,
   and wherein said activator-signal controller is operable, when said recording apparatus is being placed in said second recording mode, to inhibit output of ones of said activator signals that are directed to one of said drive circuits corresponding to said one of said recording head units performing the dot recording operation in said first recording mode.

15. The recording apparatus according to claim 13,
   wherein each of said activator signals outputted from said main circuit and received by said drive circuits contains a selection data,
   and wherein each of said drive circuits selects one of said drive waveform signals from among the corresponding drive waveform signal set, based on said selection data, and generates said drive signal having a waveform corresponding to the waveform of the selected one of said drive waveform signals.

16. The recording apparatus according to claim 12, wherein said at least one common signal wire consists of a plurality of common signal wires which transmit the respective drive waveform signals of the one drive waveform signal set that is received by the one drive circuit corresponding to the one recording head unit performing the dot recording operation in said first recording mode, and also the respective drive waveform signals of the one drive waveform signal set that is received by the one drive circuit corresponding to the one recording head unit performing the dot recording operation in said second recording mode.

17. The recording apparatus according to claim 12, wherein the number of said at least one common signal wire is equal to or smaller than the number of ones of said signal wires that are required to transmit the respective drive waveform signals of one of said drive waveform signal sets that is received by one of said drive circuits corresponding to one of said other of said recording head units performing the dot recording operation in said second recording mode.

18. The recording apparatus according to claim 12,
   wherein each of said at least one common signal wire has a fork at which the common signal wire is divided into branch portions that are connected to the respective drive circuits,
   and wherein said fork and said branch portions of each of said at least one common signal wire are located within a head driver unit that incorporates said drive circuits therein.

19. The recording apparatus according to claim 12, wherein said one of said recording head units performs the dot recording operation using a black color material as the recording material, while each of said other of said recording head units performs the dot recording operation using a non-black material as the recording material.

20. The recording apparatus according to claim 12, wherein said main circuit includes a drive-waveform-signal-set selector operable to select at least one of said plurality of drive waveform signal sets that is to be outputted from said main circuit, depending upon in which one of said first and second recording modes said recording apparatus is placed.

21. The recording apparatus according to claim 12, further comprising:
- a stationary main body in which said main circuit is fixedly disposed;
- a carriage movable relative to said stationary main body and carrying said recording head unit and a head driver unit that incorporates said drive circuits therein; and
- a flexible cable connecting said main circuit and said head driver unit,
- wherein each of said at least one common signal wire has a fork at which the common signal wire is divided into branch portions that are contiguous to a common portion of said common signal wire,
- and wherein said common portion of each of said at least one common signal wire is provided by said flexible cable.

22. The recording apparatus according to claim 12,
- wherein said recording head unit has a plurality of ink chambers each of which stores therein an ink as a corresponding one of the recording materials,
- and wherein each of said actuators is activated by said drive signal, so as to change a volume of a corresponding one of said ink chambers, for ejecting the ink in the form of an ink droplet.

* * * * *